Figure 1:
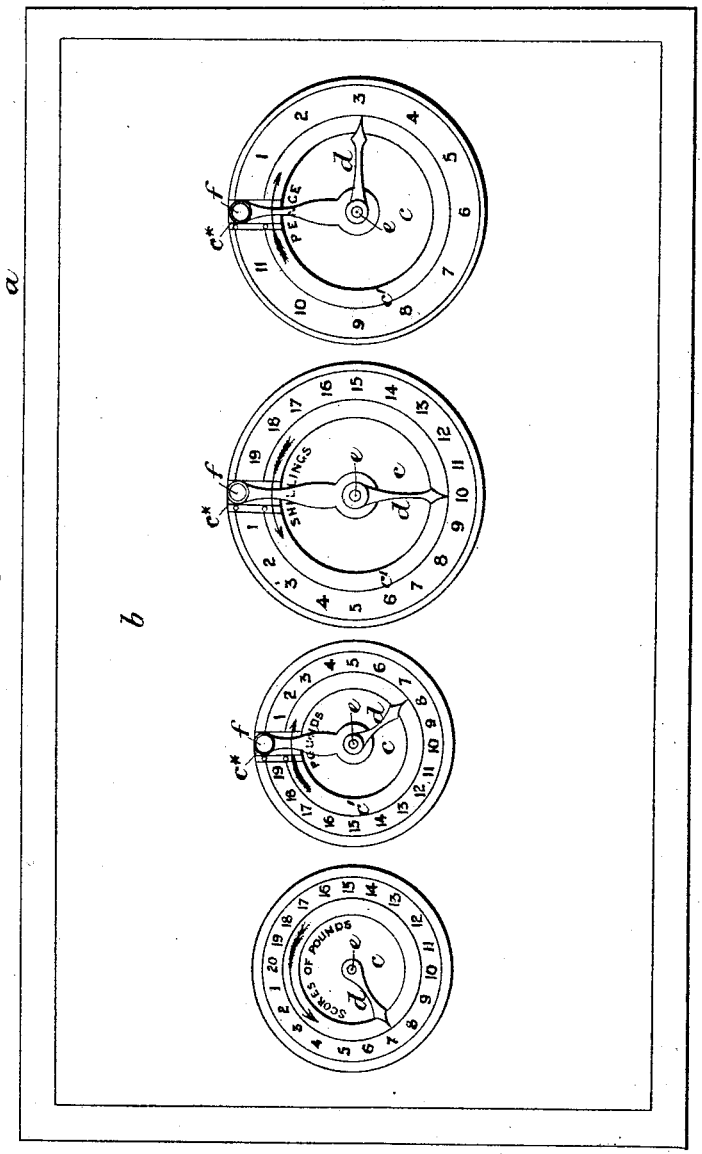

(No Model.) 3 Sheets—Sheet 1.
B. W. WEBB.
CASHIER'S REGISTERING APPARATUS.

No. 274,424. Patented Mar. 20, 1883.

Witnesses.
J. A. Rutherford
Robert Everett

Inventor.
Browne W. Webb
By James L. Norris.
Atty.

(No Model.) 3 Sheets—Sheet 2.
B. W. WEBB.
CASHIER'S REGISTERING APPARATUS.
No. 274,424. Patented Mar. 20, 1883.
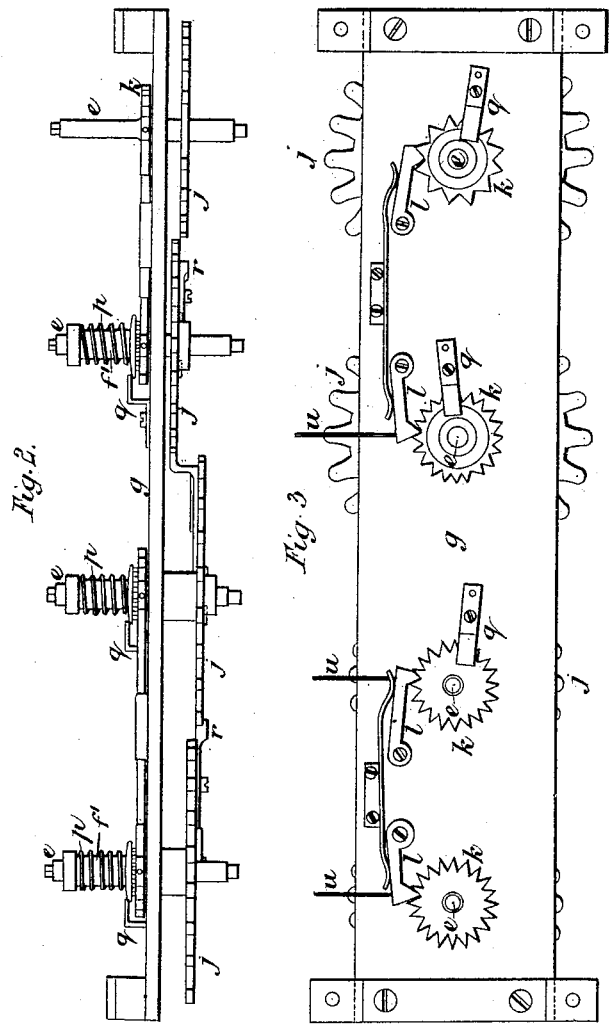
Witnesses.
J. A. Rutherford
Robert Everett
Inventor:
Browne W. Webb,
By James L. Norris
Atty.

(No Model.)
3 Sheets—Sheet 3.
B. W. WEBB.
CASHIER'S REGISTERING APPARATUS.
No. 274,424. Patented Mar. 20, 1883.
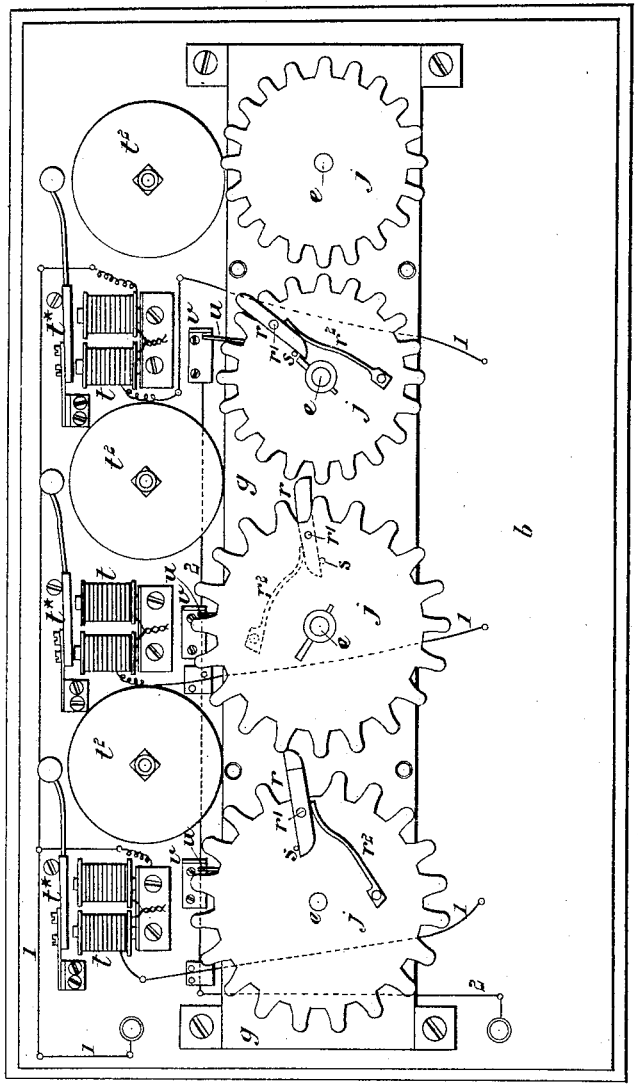
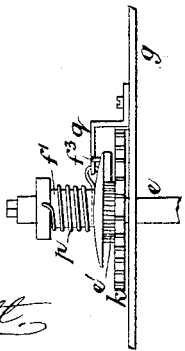
Witnesses.
J. A. Rutherford
Robert Everett
Inventor,
Browne W. Webb,
By James L. Norris
Atty.

UNITED STATES PATENT OFFICE.

BROWNE WOLSEY WEBB, OF LONDON, ENGLAND.

CASHIER'S REGISTERING APPARATUS.

SPECIFICATION forming part of Letters Patent No. 274,424, dated March 20, 1883.

Application filed August 25, 1881. (No model.) Patented in England July 8, 1881, No. 3,009; in France January 7, 1882, No. 146,741; in Belgium January 12, 1882, No. 56,753, and in Canada July 15, 1882, No. 15,118.

*To all whom it may concern:*

Be it known that I, BROWNE WOLSEY WEBB, of London, England, have invented new and useful improvements in tills for the prevention of fraud by persons who receive money in shops or other places, (for which I have obtained provisional protection in Great Britain, dated 8th July, 1881, No. 3,009,) of which the following is a specification.

This invention has for its object improvements in tills for the prevention of fraud by persons who receive money in shops or other places. For this purpose I use an apparatus which I term a "check-till" or "tell-tale," and which is constructed with clock-work arranged to act in conjunction with an electric battery and set of bells in such a manner that all the money received by the cashier will be recorded by means of such apparatus. This apparatus or mechanism comprises a series of toothed wheels, indexes, and other devices operating to indicate simultaneously on dials or faces and on the said bells any amount paid to the person in charge of the till. It is obvious that the said apparatus may be adapted to the English, American, or any other monetary scale or system, according to the State or country in which it is to be used. In the following description I refer only to the use of the English system, which affords a very convenient illustration of the working of my invention. The clock faces or dials are marked to indicate by the movements of their indices pounds, shillings, and pence, and when any sum has been paid the indices move to the proper positions to register the sum on the series of dials, and the electric bells indicate the same audibly (so that the person who pays the money may know if the payment is correctly recorded) by striking as many times as there are pounds, shillings, or pence in the amount received. For instance, should a customer pay the shopman in charge of the till, say, one pound, fourteen shillings, and six pence, one bell will strike once, another bell fourteen times, and another bell six times. This amount will by the indexes be added to the sum previously registered on the dials, so that the till keeps a perfect record of the total amount that has been paid during a day or other period of time. The money in the till at the end of this period should of course correspond with the amount registered on the dials. Any discrepancy denotes fraud, and the extent of the same is at once apparent. The battery and bells may or may not be placed in the box with the clock-work. The said till or apparatus may be placed in the cashier's desk, or on the counter or bar, and connected with bells placed in the office or parlor, the battery being arranged in any convenient place. After the close of business for the day the till or tell-tale can be removed and unlocked by the proprietor or other authorized person, who sets the indexes at zero for the next day's use.

My improved apparatus is illustrated in the accompanying drawings, in which Figure 1 is a plan of the said apparatus inserted in its box or case, and Fig. 2 is a side elevation of this apparatus removed from the said box or case. Fig. 3 is a plan of the parts of the said apparatus below the cover or bed, hereinafter described; and Fig. 4 is an under side view of the said apparatus or mechanism below the cover or lid. Fig. 5 is a side view, and Fig. 6 an under side view, of certain details of said mechanism, hereinafter described.

Like letters indicate the same parts throughout the drawings.

In carrying the said invention into practice I construct a case or box, $a$, of suitable form and dimensions, and provide the same with a lid or cover, $b$, which is fitted to slide in the said case, and which I term the "bed." On the top or outer side of this bed I mount the dials $c$. There may be any number of the latter; but I will in the following description refer to an apparatus with four dials—that is to say, one for pence, one for shillings, one for pounds, and one for scores of pounds. Each of these dials is properly marked with figures, and is provided with an index or pointer, $d$, fixed on an arbor, $e$, which is provided with a starting or actuating handle, $f$. Each dial is surrounded with a rim, $c'$, of brass or other metal, in which, at the zero-point, is inserted a piece, $c^*$, of vulcanite or other suitable insulating material, to which the said starting-handle $f$ returns after each operation, and on which it rests till the next operation, the electric circuit being then broken or interrupted.

Below the bed $b$, and supported thereby, to prevent any motion of the arbor or spindle $e$ during the backward movement of the handle $f$ to its first or normal position, I provide the devices represented in Figs. 5 and 6, in which it will be seen that I attach to the arbor $e$ a ratchet-wheel, $e'$, and connect to the hub or boss $f'$ of the handle $f$, which is loose upon said arbor $e$, a spring-pawl, $f^2$. This pawl in in each forward movement of the said handle engages with a tooth of the wheel $e'$, thereby rotating the same, and consequently the arbor $e$ and pointer $d$; but in the return movement of said handle the pawl $f^2$ rides over the teeth of the ratchet-wheel, and does not therefore alter the position of the pointer. These shafts or spindles $e$ are geared together by toothed wheels $j$, which I term the "main wheels." Each arbor is provided with a ratchet-wheel, $k$, arranged in combination with a pawl or click, $l$, which is designed to hold the said ratchet-wheel, and thereby prevent the turning of the said arbor until the handle $f$ is moved from the insulated point $c^*$.

To the hub $f'$ of each handle $f$ is attached one end of a spiral spring, $p$, whose other end is attached to a bracket or stop, $q$, on the plate $g$. This spring serves to carry the handle $f$ back to its normal or zero point when it is released, after having been turned around, or partially around, over the disk $c$. The hub or boss of each of the handles $f$ is provided with a pin, $f^3$, (see Figs. 5 and 6,) which is adapted to come in contact with the projecting arm or bracket $q$, that serves as a stop to prevent too great a recoil of said handle when the same is released. The said pin and arm, moreover, insure the stopping of the said handle at the zero-point in whichever direction it may be turned.

One novel feature of my invention is the peculiar kind of wheel-gearing employed to connect the dial-shafts $e$ with each other, so that they will operate conjointly, and the proper amounts in pounds, shillings, and pence will be registered on the series of dials by the turning of the starting-handle of one of the said arbors. The main wheels $j$, which form this gearing, are toothed, as shown in Fig. 4; but instead of being geared together in the ordinary manner they are arranged as follows—that is to say, the wheel of the first dial-shaft, $e$, is provided with a device, $r$, which I term a "spring-tooth." This spring-tooth is pivoted at $r'$, near the periphery of the wheel, and projects outward beyond the teeth formed on the periphery of the said wheel, so that when it approaches the position wherein it will coincide with a line drawn from the axis of the said wheel to that of the second wheel the said spring-tooth will gear with the ordinary teeth of the said second wheel, and will turn the latter such a distance as to cause its index or pointer $d$ to travel over one division of its dial $c$. The said second wheel is in like manner provided with a spring-tooth to engage with the main wheel of the third spindle, and the last-named wheel has a similar tooth to engage with the main wheel of the fourth spindle. Each spring-tooth may be provided with a tail, which is arranged to bear against the spindle $e$, and which forms the spring; or, in lieu of forming the tooth with a spring-tail, I can employ a separate spring, $r^2$, in connection therewith, as shown in Fig. 4. A small stop, $s$, is fixed in the wheel in such a position that when the latter is turned forward the tooth is unyielding and will act on the next adjacent wheel in the series, as above described; but if it is desired to turn the second wheel forward without turning the first wheel the said spring $r^2$ and stop $s$ will allow the spring-tooth to yield and let the said second wheel pass. This arrangement of gearing therefore not only permits me to actuate all of the arbors together, but also allows them to be turned separately or independently of each other; and it will be much more compact and convenient than the ordinary wheel-and-pinion gearing.

Another novel feature of my invention is the combination, as specified, with the above-described apparatus, of means for sounding the bells by electricity. To provide for the sounding of the bells on the movement of either of the handles $f$, I connect the wire 1 from one terminal of the battery to the electro-magnets $t$, which, on being energized by the passage of the electric current, attract the armature $t^*$, so that the hammers thereon strike the bells $t^2$. This wire 1 is also connected to the rim $c'$ of the first, second, and third dials $c$. The wire 2 from the other terminal of the battery is connected with the metal contact-pieces $v$, at which the circuit is normally broken. To permit the closing of the circuit through said pieces, I attach to the parts $l$, which engage the ratchet-wheels $k$, the arms, rods, or pieces $u$, which are brought into contact with the said pieces by the outward movement of the pawl each time the ratchet-wheel is moved the distance of one tooth.

The operation of the said devices is as follows: When the handle $f$ of either of the dials rests in its normal position upon the insulating-piece $c^*$, the circuit is broken, as no current can pass from the rim $c'$ into the said handle and thence to the arm $u$. As soon, however, as either of the said handles is moved from the insulating-piece $c^*$, the current flows through the said handle and through the spindle or arbor $e$ to the arm $u$, and when the handle is turned to the extent of one division the said arm will be forced by the movement of the pawl $l$ into contact with the piece $v$ and complete the circuit through the electro-magnet $t$, thereby causing the bell to be sounded. If the handle is moved over several divisions upon the dial $e$, then the bell will be rung a number of times, corresponding with that of the divisions passed over, as the contact of pieces $v$ $u$ will be effected at each movement of a tooth of the ratchet-wheel $k$ past the pawl $l$.

What I claim is—

1. The dial-rim $c'$, provided with the piece $c^*$ of insulating material, in combination with the handle $f$ and the pointer $d$, substantially as above set forth, and for the purpose specified.

2. The arbor $e$, carrying the handle $f$, in combination with the ratchet-wheel $k$, the pawl or click $l$, the rod $u$, and the contact-pieces $v$, substantially as above set forth, and for the purposes specified.

3. The combination, with the rims $c'$, provided with the insulating-pieces $c^*$, of the handles $f$, mounted upon the arbors $e$, the stops $f^3$ and $q$, the ratchet-wheels $k$, the rods $u$, and contact-pieces $v$, for closing the circuit to effect the ringing of the bells, and the toothed wheels $j$, provided with the spring-teeth $r$, all substantially as above set forth, and for the purposes specified.

BROWNE WOLSEY WEBB.

Witnesses:
  LEWIS SANDERSON,
  P. DEVIN.